2,897,112
PEST COMBATING COMPOSITIONS

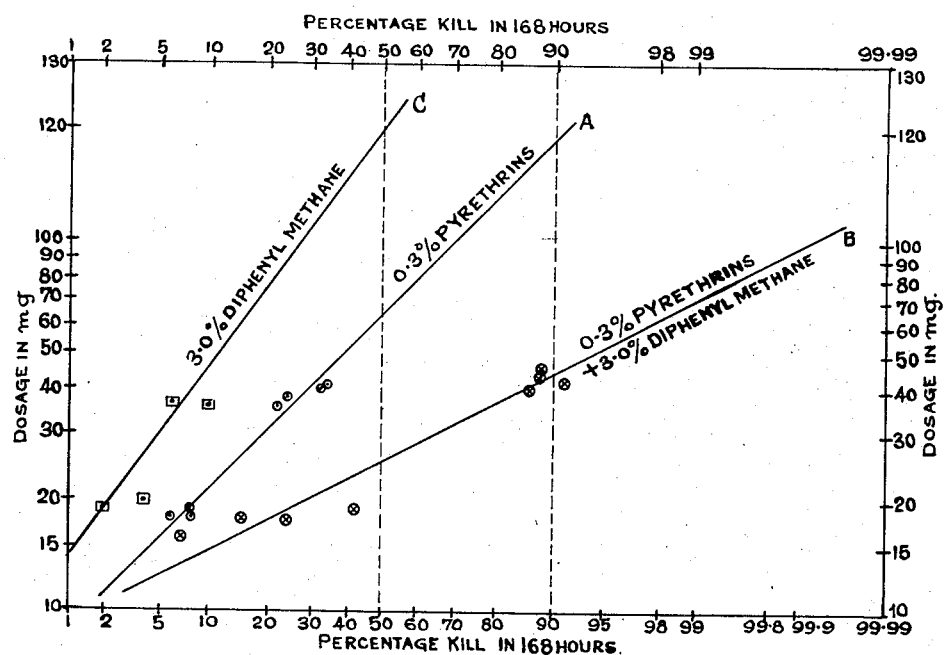

Arthur Douglas Harford, Sunbury-on-Thames, and Herbert Ward Vernon, London, England Application December 27, 1956, Serial No. 630,957

Claims priority, application Great Britain January 6, 1956

1 Claim. (Cl. 167—30)

This invention relates to improved pest combating compositions.

It is known to use compositions comprising pyrethrins for combating pests. Usually the pyrethrins are employed in the form of an extract of the active principle of a plant of the genus Pyrethrum and conveniently may be applied, as solutions in petroleum distillate fractions, in the form of liquid sprays.

While it is recognised that the pyrethrins have a degree of toxicity for many insect pests, they are of particular value in providing the means of rapidly immobilising the pests and it is common practice to include in the pyrethrin containing composition at least one other component which although slower acting is of higher toxicity. By the use of such compositions it is possible to ensure that the pests are rapidly immobilised until the slower acting component has had time to be effective. Thus, in the application of insecticidal containing sprays to the killing of house flies it is considered desirable to include in the composition a component such as pyrethrin which provides a high knock down rate.

Pyrethrins and extracts containing pyrethrins are expensive and it is therefore desirable to reduce as far as possible the quantities of these materials employed in the compositions.

It has been shown that the addition of certain compounds, which are not necessarily insecticidal, to these compositions leads to an increase in the efficiency of the compositions and thus, by their inclusion, permit a reduction in the amount of pyrethrins employed. Compounds which act in this manner are known as synergists.

Throughout this specification the term "synergist" is used with reference to a compound which, in admixture with another component, gives a composition having a pharmacodynamic effect which is greater than the simple summation of the effects produced by the inividual components of said composition.

Examples of synergists which have been used in sprays for combating house flies are iso-butyl undecylenamide and sesame oil.

Usually the compositions containing pyrethrins are employed in the form of sprays and the technical literature contains a description of a wide variety of solvents which may be employed for producing a solution of suitable characteristics for application in this manner. A number of compositions are described containing petroleum fractions together with an oxygenated solvent, such as a ketone. Thus compositions have been described containing an extract of pyrethrin in kerosine or a heavy petroleum oil togther with a phenol and, as solvent, a cyclic ketone such as cyclohexanone.

It is an object of the present invention to provide improved pest-combating compositions. It is a further object to provide pest-combating compositions containing pyrethrins in the presence of an economically attractive synergist therefor. Other objects will appear hereinafter.

According to the present invention there is provided an improved pest combating composition comprising at least one pyrethrin and at least one compound having the formula A—X—A$^1$, where A and A$^1$ are aryl groups, being substituted or unsubstituted hydrocarbon radicals and being the same or different groups, and X is an alkylene group.

Preferably the groups A and A$^1$ (being the same or different) are phenyl, tolyl or xylyl groups. Preferably the group X is a methylene, ethylene, propylene or butylene group, the methylene group being particularly preferred. Preferably the groups, A, A$^1$ and X do not bear non-hydrocarbon substituent groups. A particularly preferred compound of the formula A—X—A$^1$ is diphenyl methane. Other compounds of the formula A—X—A$^1$ which are suitable are ditolylmethanes, (p-p$^1$, o-o$^1$, m-m$^1$, m-p$^1$, o-p$^1$ and m-o$^1$) dixylyl methanes, tolyl xylyl methanes, tolyl phenyl methanes, cumyl phenyl methanes, cumyl tolyl methanes, cumyl xylyl methanes, dicumyl methanes, diphenyl ethanes, ditolyl ethanes, dixylyl ethanes, diphenyl propanes, dixylyl propanes, diphenyl butanes, ditolyl butanes, alkoxy- derivatives of the above compounds, for example diethoxy-diphenyl methane and halogen substituted derivatives of the said compounds for example para chloro-diphenylmethane.

The pyrethrin may be employed in the form of a pyrethrum extract.

In general it is found convenient to include in the pest-combating compositions a proportion of a highly toxic insecticide, to increase the percentage kill obtained by the composition. Suitable insecticides include the gamma isomer of benzene hexachloride, p,p$^1$-dichlorodiphenyl trichloro-ethane and "Dieldrin."

The compositions hereinbefore described are very suitably employed in the form of a solution in a hydrocarbon distillate fraction.

Thus according to the invention there is also provided a pest combating mixture consisting of a solution of a pyrethrin and a compound of the formula A—X—A$^1$ as hereinbefore defined, in the presence or absence of a highly toxic insecticide, in a hydrocarbon distillate fraction.

Preferred hydrocarbon distillate fractions are kerosine, white spirit and technical white oil fractions of petroleum.

Preferably the pest combating mixture contains between 0.02% and 0.5% wt./vol. of total pyrethrins.

If desired there may also be included in the composition as a further synergist, an aryl alkyl ketone. Preferably the ketone is an aryl alkyl ketone in which the aryl group consists of an unsubstituted or alkyl substituted phenyl group.

Preferably the ketone is an aryl alkyl ketone in which the alkyl group comprises 1–4 carbon atoms.

Particularly preferred ketones are acetophenone and the methyl acetophenones. Other ketones which may be employed include methyl tolyl ketones, methyl xylyl ketones, methyl cumyl ketones, ethyl phenyl ketone, ethyl tolyl ketones, ethyl xylyl ketones, ethyl cumyl ketones, propyl phenyl ketone, propyl tolyl ketones, propyl xylyl ketones, butyl phenyl ketones, butyl tolyl ketones, amyl phenyl ketones.

The compound of Formula A—X—A¹ may be employed in widely differing amounts. Preferably a ratio of the A—X—A¹ compound to total pyrethrin in the range 5:1 to 15:1 by weight is employed.

When used in the absence of aryl alkyl ketones, to achieve a high knock-down activity, ratios in the range 10:1 to 12:1 are preferred. When used with aryl alkyl ketones, particularly acetophenone, in the ratio of A—X—A¹ compound/aryl alkyl ketone in the range 95/5 to 50/50 by weight, the preferred ratios of total A—X—A¹ compound and aryl alkyl ketone to total pyrethrins lie in the range 10/1 to 12/1.

For high knock down activity it is preferred to use, as synergist, mixtures of A—X—A¹ compound and aryl alkyl ketone, in which the relative proportions lie in the range 60/40 to 2/98, the mixture of ratio 5:95 being very suitable. For blending under cold weather conditions, the mixture of ratio 50:50 is particularly suitable. All ratios are given by weight.

When the compositions of this invention take the form of a solution in a hydrocarbon distillate fraction at a concentration suitable for use without dilution, the pyrethrins preferably constitute 0.02 to 0.6 percent by weight of the solution, preferred concentrations of other components being determined according to the preferred ratios given hereinbefore.

Preferably the hydrocarbon containing mixture hereinbefore described contains up to 2.0 percent by weight of a highly toxic insecticide, for example, benzene hexachloride or p,p¹ dichloro diphenyl trichloroethane.

By the use of compositions according to the present invention it is possible to obtain a satisfactorily short insect knock-down time, while effecting an economy in the use of the relatively expensive pyrethrum extract.

The invention is illustrated but in no way limited by the following examples and the figure which accompanies the specification.

Pyrethrins are employed in the form of a pyrethrum extract containing 25 percent by weight of total pyrethrins.

The kerosine employed in the examples was a premium grade commercial petroleum kerosine fraction having the following characteristics.

| | | |
|---|---|---|
| Specific gravity at 60° F./60° F | | 0.7825 |
| A.S.T.M. distillation (D.86/54): | | |
| I.B.P | °C | 172 |
| 2% recovered at | °C | 180 |
| 5% recovered at | °C | 185 |
| 10% recovered at | °C | 190 |
| 20% recovered at | °C | 197 |
| 30% recovered at | °C | 203 |
| 40% recovered at | °C | 208.5 |
| 50% recovered at | °C | 214 |
| 60% recovered at | °C | 219 |
| 70% recovered at | °C | 225 |
| 80% recovered at | °C | 232 |
| 90% recovered at | °C | 244 |
| F.B.P | °C | 268 |
| Recovery | percent | 98 |
| Residue | do | 1.3 |
| Loss | do | 0.7 |
| Recovery at 185° C | do | 5 |
| Recovery at 200° C | do | 25 |
| Recovery at 240° C | do | 87.5 |

The biological tests with the common house fly (*Musca domestica* L) employed in the following examples are based on the Peet Grady test described in Soap and Sanitary Chemicals, 1954, Blue Book and Catalogue Edition, page 243 et seq. The method therein described was modified in the following respects:

(a) The volume of the chamber was 18.7 cu. ft. (i.e. approx. 1/12 of the volume of the standard Peet Grady chamber).

(b) The dosage was in all cases 1 ml. (i.e. 1/12 of the dosage employed in the standard method.)

(c) A spraying pressure of 10 p.s.i. was employed using as the spray gun an "Aerograph Artist's Brush" with a No. 2 nozzle.

(d) The number of test insects employed was 90–110 per test.

EXAMPLE 1

Pyrethrum extract containing 25% wt./v. of total pyrethrins was, (a) alone and (b) in admixture with diphenyl methane, dissolved in kerosine. The compositions were employed in a series of biological tests as hereinbefore described, with the results shown in the following Table 1.

*Table 1*

MEAN RESULTS OF THE BIOASSAY BY BP METHOD 129/53 OF A 0.05 G/100 ML PYRETHRINS SOLUTION IN KEROSINE SYNERGISED WITH BPS 1. EMPLOYING A 0.05 G/100 ML PYRETHRINS IN KEROSINE AS CONTROL AND USING *MUSCA DOMESTICA* L AS THE TEST INSECT

| Insecticide | 0.05 g/100 ml. pyrethrins | 0.05 g/100 ml. pyrethrins, 0.5 g/100 ml. diphenylmethane |
|---|---|---|
| Time for 50% knockdown in seconds | 129 | 94 |
| Time for 90% knockdown in seconds | 240 | 256 |
| Time for 100% knockdown in seconds | >600 | 452 |
| Percentage knockdown in 600 seconds | 95.6 | 100 |
| Percentage kill in 24 hours | 14 | 19 |

EXAMPLE 2

Pyrethrum extract (containing 25% wt./vol. of total pyrethrins) and acetophenone was dissolved in kerosine (a) With benzene hexachloride (BHC),
(b) With BHC and diphenyl methane (DPM),
(c) Alone,
(d) With DPM.

The compositions were employed in a series of biological tests as hereinbefore described, with the results shown in the following Table 2.

*Table 2*

MEAN RESULTS OF COMPARATIVE BIOASSAYS OF IMSHI INSECTICIDE MARK I AND IMSHI INSECTICIDE MARK II—ALSO OF BP INSECTICIDE KIG MARK I AND BP INSECTICIDE KIG MARK II BY BP METHOD 129/53

| Insecticide | (a) | (b) | (c) | (d) |
|---|---|---|---|---|
| Formulation, g./100 ml | Pyrethrins, 0.05 Acetophenone, 0.35 B.H.C., 0.1 | Pyrethrins, 0.05 DPM, 0.02 Acetophenone, 0.33 B.H.C., 0.1 | Pyrethrins, 0.3 Acetophenone, 3.0 | Pyrethrins, 0.3 DPM, 0.15 Acetophenone, 2.85 |
| Time for 50% KD¹ (secs.) | 82 | 77 | 60 | 35 |
| Time for 90% KD¹ (secs.) | 164 | 146 | 106 | 100 |
| Time for 100% KD¹ (secs.) | 480 | 310 | 250 | 155 |
| Percent KD¹ in 600 secs | 100 | 100 | 100 | 100 |
| Percent kill, 24 hours | 100 | 100 | 93 | 91 |

EXAMPLE 3

This example illustrates the use of diphenylmethane as a pyrethrin synergist in compositions containing pyrethrins, diphenylmethane and kerosine and indicates the optimum ratio of diphenylmethane to pyrethrins.

Twenty blends containing 0.05 percent by weight of pyrethrins were prepared covering the ratios of diphenylmethane to pyrethrins from 1/1 to 20/1 using kerosine as a solvent. Also there was made a 3% solution of diphenyl methane in kerosine.

These compositions were assayed by the biological test hereinbefore described. A 0.05 percent by weight solution of pyrethrins in kerosine was used as control.

The results of these tests are set out in the following Tables 3 and 3A. They show that diphenylmethane has no insecticidal properties and that the maximum knockdown activity occurs at the ratio 10/1. Beyond this point there is an increase in kill up to 48 percent at the 20/1 ratio. This example indicates that to combine the advantages of high knockdown activity with high percentage kill it is desirable to incorporate in the composition a chlorinated contact insecticide, for example, a chlorinated hydrocarbon insecticide, to ensure a 100 percent kill. It is not therefore necessary to exceed the 10/1 ratio.

methane mixture is the eutectic for the two compounds, with a melting point of −1° C. compared with 21° C. for acetophenone and 27° C. for diphenylmethane. This mixture would therefore be useful when blending in cold weather conditions.

Table 4

| Insecticide blend: | | | | |
|---|---|---|---|---|
| Pyrethrins, percent wt./wt | 0.05 | 0.05 | 0.05 | 0.05 |
| Acetophenone, percent wt./wt | 0.475 | 0.45 | 0.25 | No synergist |
| Diphenylmethane, percent wt./wt | 0.025 | 0.05 | 0.25 | |
| Percent acetophenone: | | | | |
| Percent diphenylmethane | 95:5 | 90:10 | 50:50 | |
| Time for 50% knockdown in seconds | 92 | 99 | 96 | 151 |
| Time for 90% knockdown in seconds | 166 | 200 | 246 | 417 |
| Time for 100% knockdown in seconds | 500 | 428 | 464 | >600 |
| Percentage knockdown in 600 seconds | 100 | 100 | 100 | 96 |
| Percentage kill in 24 hours | 22 | 16 | 30 | 14 |

EXAMPLE 5

This example illustrates the use of compositions containing pyrethrins, diphenylmethane and kerosine to-

Table 3

| Insecticide blend: | | | | | | | | | | | |
|---|---|---|---|---|---|---|---|---|---|---|---|
| Pyrethrins, percent weight/wt | 0.05 | 0.05 | 0.05 | 0.05 | 0.05 | 0.05 | 0.05 | 0.05 | 0.05 | 0.05 | 0.05 |
| Diphenylmethane, percent weight/wt | Nil | 0.05 | 0.10 | 0.15 | 0.20 | 0.25 | 0.30 | 0.35 | 0.40 | 0.45 | 0.50 |
| Ratio: | | | | | | | | | | | |
| Diphenylmethane/pyrethrins | | 1/1 | 2/1 | 3/1 | 4/1 | 5/1 | 6/1 | 7/1 | 8/1 | 9/1 | 10/1 |
| Time for 50% knockdown in sec | 143 | 114 | 113 | 112 | 106 | 92 | 90 | 89 | 88 | 87 | 86 |
| Time for 90% knockdown in sec | 416 | 303 | 286 | 269 | 241 | 220 | 213 | 205 | 205 | 204 | 203 |
| Time for 100% knockdown in sec | >600 | >600 | >600 | >600 | >600 | >600 | >600 | >600 | >600 | >600 | 460 |
| Percentage knockdown in 600 sec | 96 | 95 | 96 | 96 | 98 | 96 | 98 | 98 | 99 | 99 | 100 |
| Percentage kill in 24 hours | 16 | 19 | 18 | 20 | 19 | 22 | 21 | 25 | 22 | 26 | 28 |

Table 3A

| Insecticide blend: | | | | | | | | | | | |
|---|---|---|---|---|---|---|---|---|---|---|---|
| Pyrethrins, percent wt./wt | 0.05 | 0.05 | 0.05 | 0.05 | 0.05 | 0.05 | 0.05 | 0.05 | 0.05 | 0.05 | Nil |
| Diphenylmethane, percent wt./wt | 0.55 | 0.60 | 0.65 | 0.70 | 0.75 | 0.80 | 0.85 | 0.90 | 0.95 | 1.00 | 3.0 |
| Ratio: | | | | | | | | | | | |
| Diphenylmethane/pyrethrins | 11/1 | 12/1 | 13/1 | 14/1 | 15/1 | 16/1 | 17/1 | 18/1 | 19/1 | 20/1 | |
| Time for 50% knockdown in sec | 86 | 85 | 84 | 84 | 84 | 83 | 83 | 82 | 82 | 82 | >600 |
| Time for 90% knockdown in sec | 202 | 200 | 199 | 198 | 197 | 196 | 194 | 193 | 192 | 191 | >600 |
| Time for 100% knockdown in sec | 457 | 480 | 442 | 512 | 570 | 500 | 414 | 420 | 400 | 360 | >600 |
| Percentage knockdown in 600 sec | 100 | 100 | 100 | 100 | 100 | 100 | 100 | 100 | 100 | 100 | 0 |
| Percentage kill in 24 hours | 27 | 31 | 30 | 33 | 32 | 32 | 35 | 42 | 46 | 48 | 0 |

EXAMPLE 4

This example illustrates the use of diphenylmethane and acetophenone as associated synergists for pyrethrins in compositions containing pyrethrins, diphenylmethane and kerosine.

Three blends were prepared containing 0.05 percent by weight of pyrethrins synergised at a 10/1 ratio with 95 percent acetophenone+5 percent diphenylmethane, 90 percent acetophene+10 percent diphenylmethane, and 50 percent acetophenone+50 percent diphenylmethane respectively. They were assayed by the biological test hereinbefore described using 0.05 percent by weight of pyrethrins as control.

The results are tabulated in Table 4. All three blends show an increase in knockdown activity and some improvement in respect of kill on comparison with control. It is to be noted that the 50/50 acetophenone/diphenylgether with either DDT or gamma benzene hexachloride to raise the percentage kill to the 100 percent level.

Two blends were prepared using kerosine as solvent with the following compositions.

Blend A:                                     Percent wt./wt.
    Pyrethrins _____ 0.05
    Diphenylmethane _____ 0.5
    DDT _____ 0.5
Blend B:
    Pyrethrins _____ 0.05
    Diphenylmethane _____ 0.5
    Gamma-BHC _____ 0.1

These blends were assayed by the biological tests hereinbefore described using the current Official Test Insecticide (O.T.I.) as control. This is a 0.1 percent weight by volume solution of pyrethrins in refined kerosine prepared and distributed by The Chemical Specialities Manufacturers Association Incorporated, New York, U.S.A.

The results are set out in Table 5 and show that both using a 0.05% wt./wt. pyrethrins solution as control. The results are set out in Table 6.

All the compounds exhibited a synergistic effect.

Table 6

| Insecticide Blend: Pyrethrins, percent wt./wt. Synergist, percent wt./wt. | 0.05 Diphenylmethane, 0.5 | 0.05 Ditolylmethane, 0.5 | 0.05 Dixylylmethane, 0.5 | 0.05 Diethoxy-diphenylmethane, 0.5 | |
|---|---|---|---|---|---|
| Chemical formula of synergist | $C_6H_5\text{-}CH_2\text{-}C_6H_5$ | $CH_3.C_6H_4.CH_2.C_6H_4CH_3$ | $(CH_3)_2.C_6H_3.CH_2.C_6H_3.(CH_3)_2$ | $C_2H_5O.C_6H_5.CH_2.C_6H_5OC_2H_5$ | |
| Time for 50% knockdown in sec. | 86 | 94 | 111 | 104 | |
| Time for 90% knockdown in sec. | 183 | 260 | 208 | 175 | |
| Time for 100% knockdown in sec. | 430 | 508 | 530 | 363 | |
| Percentage knockdown in 600 sec. | 100 | 100 | 100 | 100 | |
| Percentage kill in 24 hours | 28 | 23 | 26 | 22 | |

| Insecticide blend: Pyrethrins percent wt./wt. Synergist percent wt./wt. | 0.05 p Chloro-diphenyl-methane, 0.5 | 0.05 p Tolylphenylmethane, 0.5 | 0.05 Cumyl phenylmethane, 0.5 | 0.05 a Methyl p ditolyl methane, 0.5 | 0.05 No synergist |
|---|---|---|---|---|---|
| Chemical formula of synergist | $C_6H_5CH_2.C_6H_4.Cl$ | $C_6H_5.CH_2.C_6H_4CH_3$ | $C_6H_5.CH_2.C_6H_4.C_3H_7$ | $CH_3.C_6H_4CH(CH_3)C_6H_4.CH_3$ | |
| Time for 50% knockdown in sec. | 92 | 88 | 148 | 118 | 160 |
| Time for 90% knockdown in sec. | 285 | 240 | 300 | 270 | 419 |
| Time for 100% knockdown in sec. | 504 | 445 | 506 | 440 | >600 |
| Percentage knockdown in 600 sec. | 100 | 100 | 100 | 100 | 95 |
| Percentage kill in 24 hours | 17 | 16 | 22 | 22 | 14 | compositions have a better biological performance than the Official Test Insecticide (O.T.I.) and would grade as AA sprays.

Table 5

| Insecticide blend | O.T.I. (1955-6) 0.1% wt./vol. pyrethrins | A. Pyrethrins, 0.05% wt./wt.; diphenylmethane, 0.5% wt./wt.; DDT, 0.5% wt./wt. | B. Pyrethrins, 0.05% wt./wt.; diphenylmethane, 0.5% wt./wt.; γBHC, 0.1% wt./wt. |
|---|---|---|---|
| Time for 50% knockdown in sec. | 95 | 90 | 89 |
| Time for 90% knockdown in sec. | 218 | 221 | 208 |
| Time for 100% knockdown in sec. | 460 | 419 | 440 |
| Percentage knockdown in 600 sec. | 100 | 100 | 100 |
| Percentage kill in 24 hours | 41 | 100 | 100 |

EXAMPLE 6

This example illustrates the use of compositions containing kerosine and pyrethrins together with a homologue or derivative of diphenylmethane.

Blends were prepared of 0.05 percent by weight pyrethrins in kerosine with the following compounds present in a concentration of 0.5% wt./wt. (i.e. in the ratio compound pyrethrins of 10/1).

| Blend No. | Compound |
|---|---|
| 1 | Ditolylmethane (p,p' dimethyl diphenylmethane). |
| 2 | Dixylylmethane (a mixture of isomers). |
| 3 | p,p' Diethoxydiphenylmethane. |
| 4 | p Chloro-diphenylmethane. |
| 5 | p Tolylphenylmethane. |
| 6 | Cumyl phenylmethane. |
| 7 | Alpha methyl p ditolylmethane. |

These blends were assayed by the biological method of test hereinbefore described against a blend containing 0.05% wt./wt. pyrethrins with 0.5% diphenylmethane

EXAMPLE 7

This example illustrates the use of compositions containing kerosine, pyrethrins and diphenylmethane as an insecticide for the red flour beetle, *Tribolium costaneum*, Tared No. 54 Whatman filter papers of 7 cm. diameter were sprayed with a kerosine blend of 0.3% wt./wt. pyrethrins with 3.0% diphenylmethane in a Kearns and March spray chamber. The treated filter papers were weighed and the amount of insecticide deposited on each determined to the nearest milligram. In this way a series of papers was impregnated with high and low dosages of insecticide. The papers were placed in 7½ cm. diameter Petri dishes and a glass ring 2 cm. high and 5½ cm. in diameter was placed on the paper. Into each ring 50 beetles were placed, and the ring covered with a circular wire gauze.

In this way four replicates at the high dose level and four replicates at the low dose level were set up and placed in a temperature controlled humidity cabinet at 80° F. and 70 percent relative humidity and left for 7 days (168 hours). At the end of that time the number of dead beetles was assessed. In this manner, at the same time and using the same generation of beetles, tests were made with 0.3 percent wt./wt. pyrethrins in kerosine and 3.0 percent wt./wt. diphenylmethane in kerosine.

The results are set out in Table 7 and the regression line for each blend is shown, in the figure accompanying this specification, as a plot on logarithmic probability paper (2 cycle). Table 8 shows the results for blend B corrected for diphenylmethane kills from line C. The lines were checked for fit by the method of J. T. Litchfield, Jr., and F. Wilcoxon. (Journal of Pharmacology and Experimental Therapeutics, 1949, 96 pp. 99–109) The results show that the potency ratio at the $LD_{50}$ for the blends A and B is 2.51 and at the $LD_{90}$ level 2.64 showing that the blend containing the pyrethrins and diphenylmethane is approximately two and a half times as potent as the blend containing the pyrethrins only.

Table 7

RESULTS OF BIOASSAY OF INSECTICIDAL BLENDS CONTAINING 0.3 PERCENT WT./WT. PYRETHRINS ONLY, 0.3 PERCENT WT./WT. PYRETHRINS WITH 3 PERCENT WT./WT. DIPHENYLMETHANE AS THE SYNERGIST AND 3.0 PERCENT WT./WT. DIPHENYLMETHANE ALONE. ALL BLENDS PREPARED WITH PREMIUM COMMERCIAL GRADE KEROSINE

| Insecticide | 0.3% wt./wt. pyrethrins (A) | | | | | | | | 0.3% wt./wt. pyrethrins+3% wt./wt. diphenylmethane (B) | | | | | | | | 3% wt./wt. diphenylmethane | | | | | | | |
|---|---|---|---|---|---|---|---|---|---|---|---|---|---|---|---|---|---|---|---|---|---|---|---|---|
| | High | | | | Low | | | | High | | | | Low | | | | High | | | | Low | | | |
| Dosage in mg | 40 | 36 | 38 | 41 | 19 | 18 | 18 | 17 | 46 | 42 | 44 | 41 | 19 | 16 | 18 | 18 | 37 | 37 | 37 | 37 | 20 | 16 | 20 | 19 |
| Percent kill after 168 hr | 33 | 22 | 24 | 34 | 8 | 8 | 6 | 6 | 98 | 100 | 96 | 94 | 44 | 9 | 17 | 26 | 6 | 6 | 6 | 10 | 4 | 0 | 4 | 0 |
| $LD_{50}$ after 168 hr, mg | 64 | | | | | | | | 25.5 | | | | | | | | | | | | | | | |
| $LD_{90}$ after 168 hr, mg | 119 | | | | | | | | 45 | | | | | | | | | | | | | | | |

Potency ratios: $\dfrac{LD_{50}^A}{LD_{50}^B}=\dfrac{64}{25.5}=2.51$ $\dfrac{LD_{90}^A}{LD_{90}^B}=\dfrac{119}{45}=2.64$

Table 8

| Dosage, mgs | High | | | | Low | | | |
|---|---|---|---|---|---|---|---|---|
| | 46 | 42 | 44 | 41 | 19 | 16 | 18 | 18 |
| Corrected kill, percent | 88 | 91 | 87 | 86 | 42 | 7 | 15 | 24 |

We claim:

An improved pest combating composition, suitable for combating houseflies, consisting essentially of a pyrethrin, diphenylmethane and acetophenone in a hydrocarbon distillate fraction, the total amount of pyrethrin being 0.02–0.6% by weight of said composition, the ratio of the weight of acetophenone to pyrethrin lying in the range 5:1 to 15:1 and the ratio of the weight of diphenylmethane to pyrethrin lying in the range 5:1 to 15:1.

References Cited in the file of this patent

UNITED STATES PATENTS 2,087,599    Hunn                 July 20, 1937

OTHER REFERENCES

Wadley: The Evidence Req. to Show Synergistic Action of Insect. and a Short Cut in Analysis, U.S.D.A. June 1945, pp. 1–7.

Lindquist: U.S.D.A. Bur. of Int. and Plant Quarantine (E–775), April 1949, pp. 1–4 and 22.

Chem. and Uses of Insect. E.R. de Ong, Reinhold Pub. Co., 1956, pp. 83–106.

King: U.S.D.A. Handbook No. 69, May 1954, pp. 38, 66 and 146.

UNITED STATES PATENT OFFICE

CERTIFICATE OF CORRECTION

Patent No. 2,897,112                          July 28, 1959

Arthur Douglas Harford et al.

It is hereby certified that error appears in the printed specification of the above numbered patent requiring correction and that the said Letters Patent should read as corrected below.

Columns 3 and 4, below Table 2, a footnote should appear as shown below instead of as in the patent:

$^1$KD=Knockdown.

Signed and sealed this 23rd day of August 1960.

(SEAL)
Attest:

KARL H. AXLINE                           ROBERT C. WATSON
Attesting Officer                        Commissioner of Patents